United States Patent
Choi et al.

(10) Patent No.: US 7,240,577 B2
(45) Date of Patent: Jul. 10, 2007

(54) ELECTRONIC GEARSHIFT APPARATUS OF SUB GEARSHIFT FOR 4 WHEEL DRIVE VEHICLE

(75) Inventors: Min-Sik Choi, Seosan-si (KR); Young-Soo Kim, Seosan-si (KR); Woo-Jong Bong, Seoul (KR)

(73) Assignee: Dymos Incorporated, Chungcheongnam-do (KR)

( * ) Notice: Subject to any disclaimer, the term of this patent is extended or adjusted under 35 U.S.C. 154(b) by 221 days.

(21) Appl. No.: 10/533,829

(22) PCT Filed: Nov. 12, 2003

(86) PCT No.: PCT/KR03/02423

§ 371 (c)(1),
(2), (4) Date: May 3, 2005

(87) PCT Pub. No.: WO2004/045885

PCT Pub. Date: Jun. 3, 2004

(65) Prior Publication Data
US 2006/0096402 A1    May 11, 2006

(30) Foreign Application Priority Data
Nov. 18, 2002    (KR) ...................... 10-2002-0071732

(51) Int. Cl.
*F16H 59/00*    (2006.01)
*F16H 61/00*    (2006.01)
*F16H 63/00*    (2006.01)

(52) U.S. Cl. ........................................ 74/337.5; 74/335
(58) Field of Classification Search .................. 74/335, 74/337.5
See application file for complete search history.

(56) References Cited

U.S. PATENT DOCUMENTS

| 5,605,201 A | * | 2/1997 | McGinn et al. ............. 180/233 |
| 6,155,126 A | | 12/2000 | Vogt et al. |
| 6,173,624 B1 | | 1/2001 | Decker |
| 6,789,440 B2 | * | 9/2004 | Bigi ......................... 74/337.5 |

FOREIGN PATENT DOCUMENTS

| JP | 57065449 A | * | 4/1982 |
| JP | 2000-205411 | | 7/2000 |

OTHER PUBLICATIONS

Search Report issued on Mar. 2, 2004 for International Application No. PCT/KR2003/002423.

* cited by examiner

Primary Examiner—Tisha Lewis
(74) Attorney, Agent, or Firm—Hoffmann & Baron, LLP

(57) ABSTRACT

An electronic gearshift device of a transfer case assembly for a four wheel drive vehicle is provided. The electric gearshift device comprises a motor, a camshaft rotatably driven by the motor, a rail member separated from the camshaft by a predetermined distance and positioned parallel to the camshaft; first and second forks installed on the rail member such that they are spaced apart from each other, and a cam fitted around and supported by the camshaft to selectively operate the first or second forks on the rail member to thereby effect gearshift.

5 Claims, 6 Drawing Sheets

PRIOR ART

ELECTRONIC GEARSHIFT APPARATUS OF SUB GEARSHIFT FOR 4 WHEEL DRIVE VEHICLE

TECHNICAL FIELD

The present invention relates, in general, to an electronic gearshift device of a transfer case assembly for a four wheel drive vehicle, and, more particularly, to an electronic gearshift device of a transfer case assembly for a four wheel drive vehicle, which employs a motor to control operation of the transfer case assembly, thereby enabling automatic gearshift.

BACKGROUND ART

As well known to those skilled in the art, transfer case assemblies for a four wheel drive vehicle are divided into a manual type in which driving scheme conversion is effected through manipulation of a driver and an electronic type in which driving mode conversion is effected by an electronic signal. In the manual type transfer case assembly, driving scheme conversion of the four wheel drive vehicle is effected as the driver directly manipulates a shift lever disposed adjacent to the driver's seat.

The manual type transfer case assembly is encountered with a problem in that, since the driver should directly manipulate the shift lever, the driver can feel fatigued, it is bothersome to manipulate the shift lever, and an accident is likely to occur while manipulating the shift lever.

In these considerations, in these days, the electronic type transfer case assembly has been widely used throughout the world in that, since gearshift is automatically effected, manipulation can be conducted in a convenient manner, fatigue of the driver can be reduced, and it is possible to prevent an accident from occurring.

A typical example of the conventional electronically controlled transfer case assembly is shown in FIG. 1.

A gearshift device 100 of the electronically controlled transfer case assembly largely comprises a camshaft 102 which is rotated by a motor 101 and is defined with a groove 103, a first fork 104 which functions to convert a wheel driving scheme between a four wheel driving scheme and a two wheel driving scheme, a second fork 105 which is manually operated by a separate lever (not shown) to convert a four wheel driving mode between a four wheel high speed driving mode and a four wheel low speed driving mode, and a gearshift rod 106 having one end which is coupled to the first fork 104 and the other end which is inserted and guided in the groove 103.

In the gearshift device 100 constructed as mentioned above, if the camshaft 102 is rotated as power is applied to the motor 101, the gearshift rod 106 inserted in the groove 103 is moved along the groove 103 to be changed in its position relative to the camshaft 102. As a result of this, the first fork 104 to which the gearshift rod 106 is coupled is moved to force a sleeve (not shown) to move, by which conversion between the four wheel driving scheme and the two wheel driving scheme is effected.

Consequently, as the motor 101 is rotated in forward or backward directions, gearshift is implemented into the four wheel driving scheme or the two wheel driving scheme.

In the meanwhile, with the wheel driving scheme converted into the four wheel driving scheme by the first fork 104, when it is necessary to convert the four wheel driving mode between the four wheel high speed driving mode and the four wheel low speed driving mode, the position of the second fork 105 is moved by operating the separate lever, by which the four wheel driving mode can be converted from the four wheel high speed driving mode into the four wheel low speed driving mode, and vice versa.

However, the conventional gearshift device 100 suffers from defects in that, since the groove 103 should be defined with a high precision in the camshaft 102, it is difficult to properly define the groove 103. Further, due to the fact that first gearshift means for effecting conversion of the wheel driving scheme between the four wheel driving scheme and the two wheel driving scheme and second gearshift means for effecting conversion of the four wheel driving mode between the four wheel high speed driving mode and the four wheel low speed driving mode should be separately provided, as the number of parts is increased, a manufacturing cost is increased, and inconvenience is caused due to the need of operating the separate lever.

Also, referring to U.S. Pat. No. 6,155,126 describing another example of a gearshift device for the electronically controlled transfer case assembly, a shift fork body is slidably coupled to a shift rail. When the shift rail is rotated, as the shift fork body is moved forward and backward in an axial direction of the shift rail, a shift collar coupled to a web member is moved forward and backward to effect desired gearshift.

Nevertheless, the conventional construction described just above has a drawback in that, since a cam for actually moving the shift fork body has a configuration of a helical thread, its machining procedure is complicated. Moreover, the helical thread has a predetermined slope, it is impossible to implement gearshift in a diversity of ways.

Referring to U.S. Pat. No. 6,173,624 describing still another example of a gearshift device for the electronically controlled transfer case assembly, an inclined surface of a predetermined slope is formed on a cam, and a cam follower is attached to an outer surface of a rail, so that gearshift is effected as a camshaft is rotated.

Nonetheless, the conventional construction described just above is not free from shortcomings in that, since the inclined surface of the predetermined slope has a fixed contour, it is difficult to effect gearshift in a diversity of ways. In particular, because the cam follower, that is, a projection is formed on the outer surface of the rail, a machining procedure is complicated, and inconvenience results from the need of changing a configuration of the entire rail.

In addition, because a fork is returned using one spring, it is difficult to promptly and precisely return the fork into its original position.

DISCLOSURE OF THE INVENTION

Accordingly, the present invention has been made keeping in mind the above problems occurring in the prior art, and an object of the present invention is to provide an electronic gearshift device of a transfer case assembly for a four wheel drive vehicle, which is constructed so that gearshift means for effecting conversion between a four wheel driving scheme and a two wheel driving scheme and gearshift means for effecting conversion between a four wheel high speed driving mode and a four wheel low speed driving mode are integrated with each other, whereby the number of parts is decreased, a manufacturing cost is reduced, a driver's operational convenience is improved, fatigue of the driver is reduced, it is possible to prevent an accident from occurring, and gearshift can be effected in a diversity of ways.

In order to achieve the above object, according to one aspect of the present invention, there is provided an electronic gearshift device of a transfer case assembly for a four wheel drive vehicle, comprising: a motor; a camshaft rotatably driven by the motor; a rail member separated from the camshaft by a predetermined distance and positioned parallel to the camshaft; first and second forks installed on the rail member such that they are spaced apart from each other; and a cam fitted around and supported by the camshaft to selectively operate the first or second forks on the rail member to thereby effect gearshift.

According to another aspect of the present invention, the cam is formed with first and second operating sections for operating the first fork to effect conversion between a four wheel driving scheme and a two wheel driving scheme, and third and fourth operating sections for operating the second fork to effect conversion between a four wheel high speed driving mode and a four wheel low speed driving mode.

According to another aspect of the present invention, in the cam, the first operating section comprises a flattened surface, the second operating section comprises a concaved surface having a predetermined radius of curvature, and each of the third and fourth operating sections comprises a plane.

According to another aspect of the present invention, first and second springs for elastically supporting the first and second forks, respectively, are provided on the rail member.

According to still another aspect of the present invention, adjacent to a lower end of the first fork, a plunger which is elastically supported by a compression spring is installed on a side of the first fork such that the plunger is selectively biased by the first or second operating sections as the cam is rotated.

According to yet still another aspect of the present invention, a pin roller is installed on a side of the second fork such that the pin roller is selectively biased by the third or fourth operating sections as the cam is rotated.

BRIEF DESCRIPTION OF THE DRAWINGS

The above and other objects, features and other advantages of the present invention will be more clearly understood from the following detailed description when taken in conjunction with the accompanying drawings, in which.

BEST MODE FOR CARRYING OUT THE INVENTION

Figure 1:
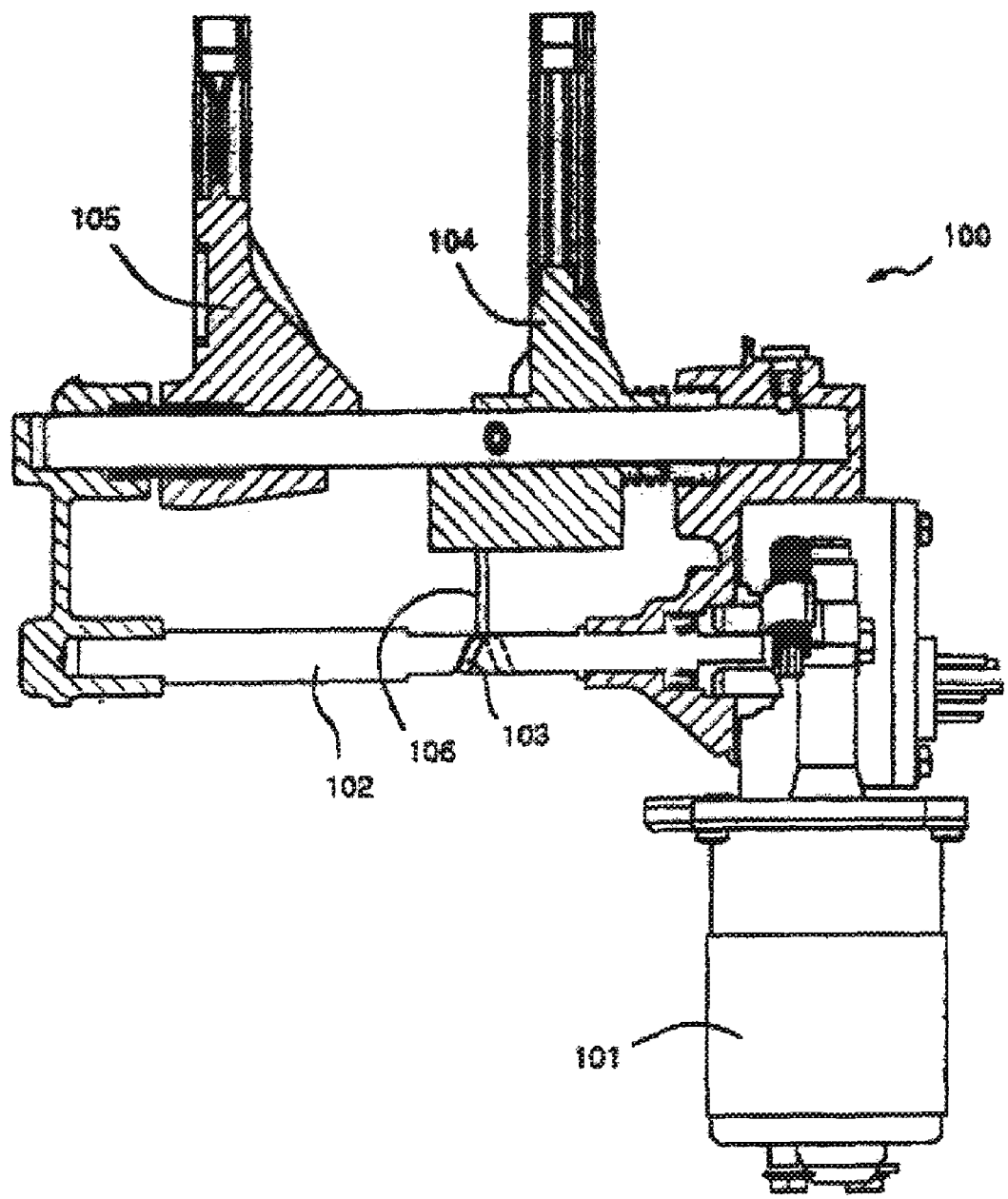
FIG. 1 is a schematic cross-sectional view illustrating the conventional electronically controlled transfer case assembly.

Reference will now be made in greater detail to a preferred embodiment of the invention, an example of which is illustrated in the accompanying drawings. Wherever possible, the same reference numerals will be used throughout the drawings and the description to refer to the same or like parts.

Figure 2:
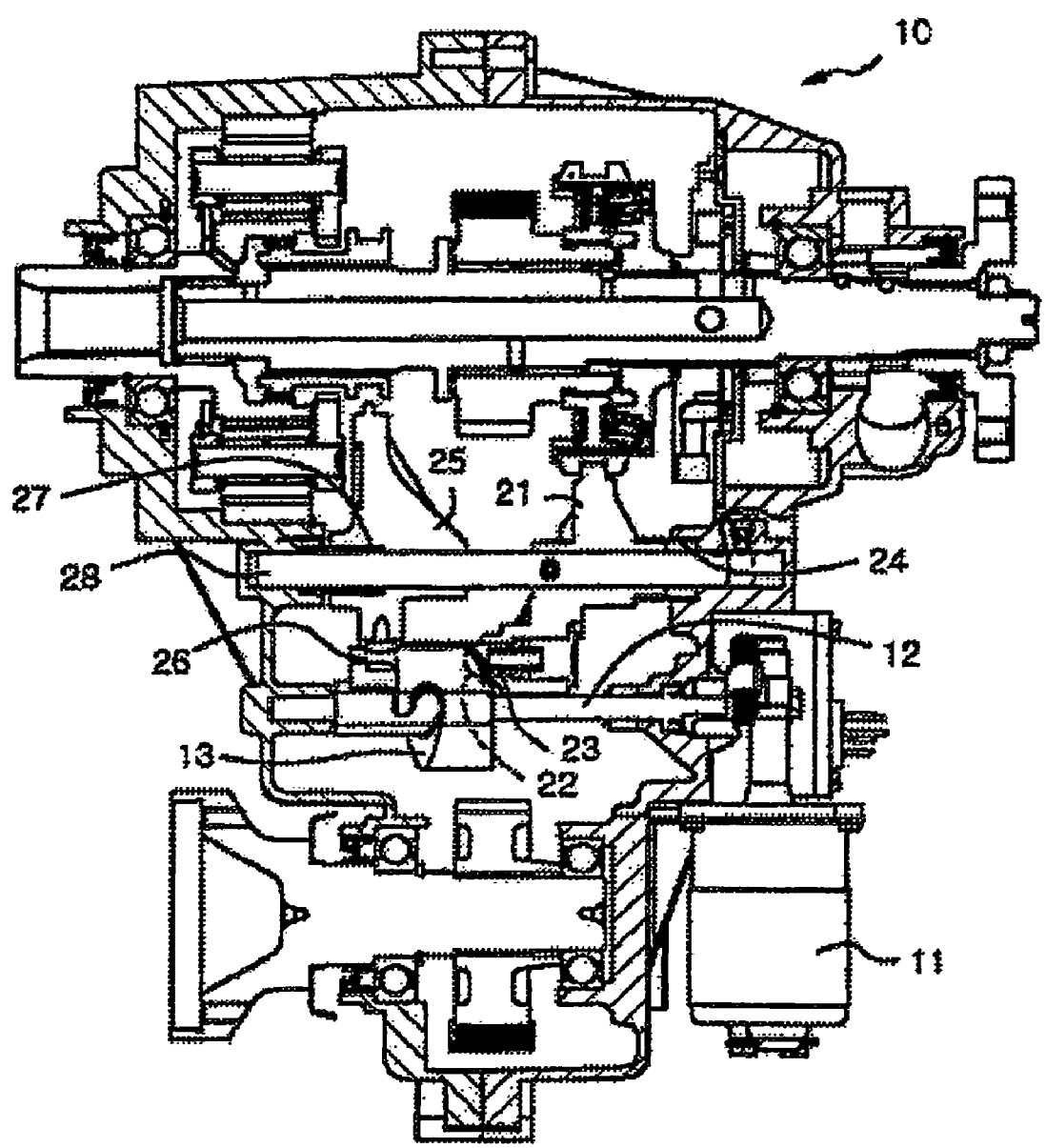
FIG. 2 is a cross-sectional view illustrating an electronically controlled transfer case assembly in accordance with a preferred embodiment of the present invention.
Figure 3:
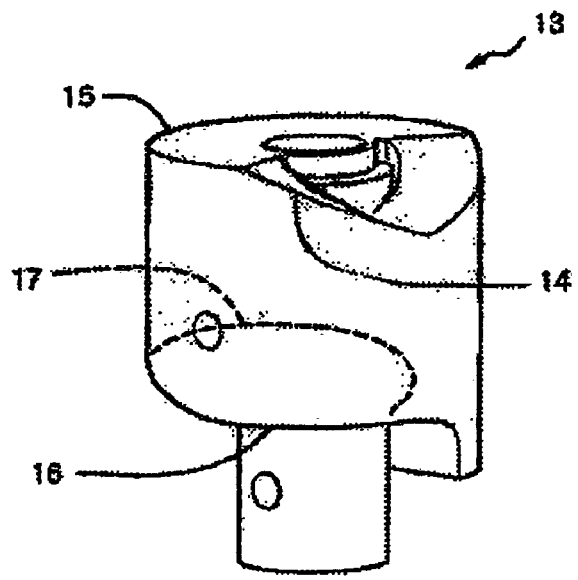
FIGS. 3 and 4 are perspective views independently illustrating a cam of the electronically controlled transfer case assembly according to the present invention.
Figure 4:
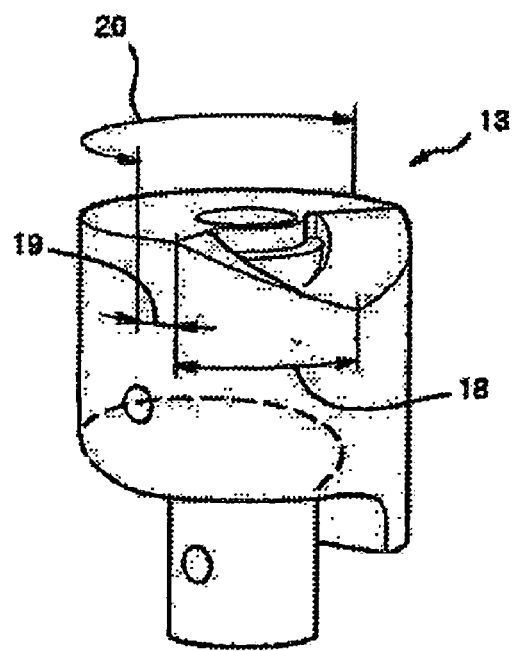
Figure 5:
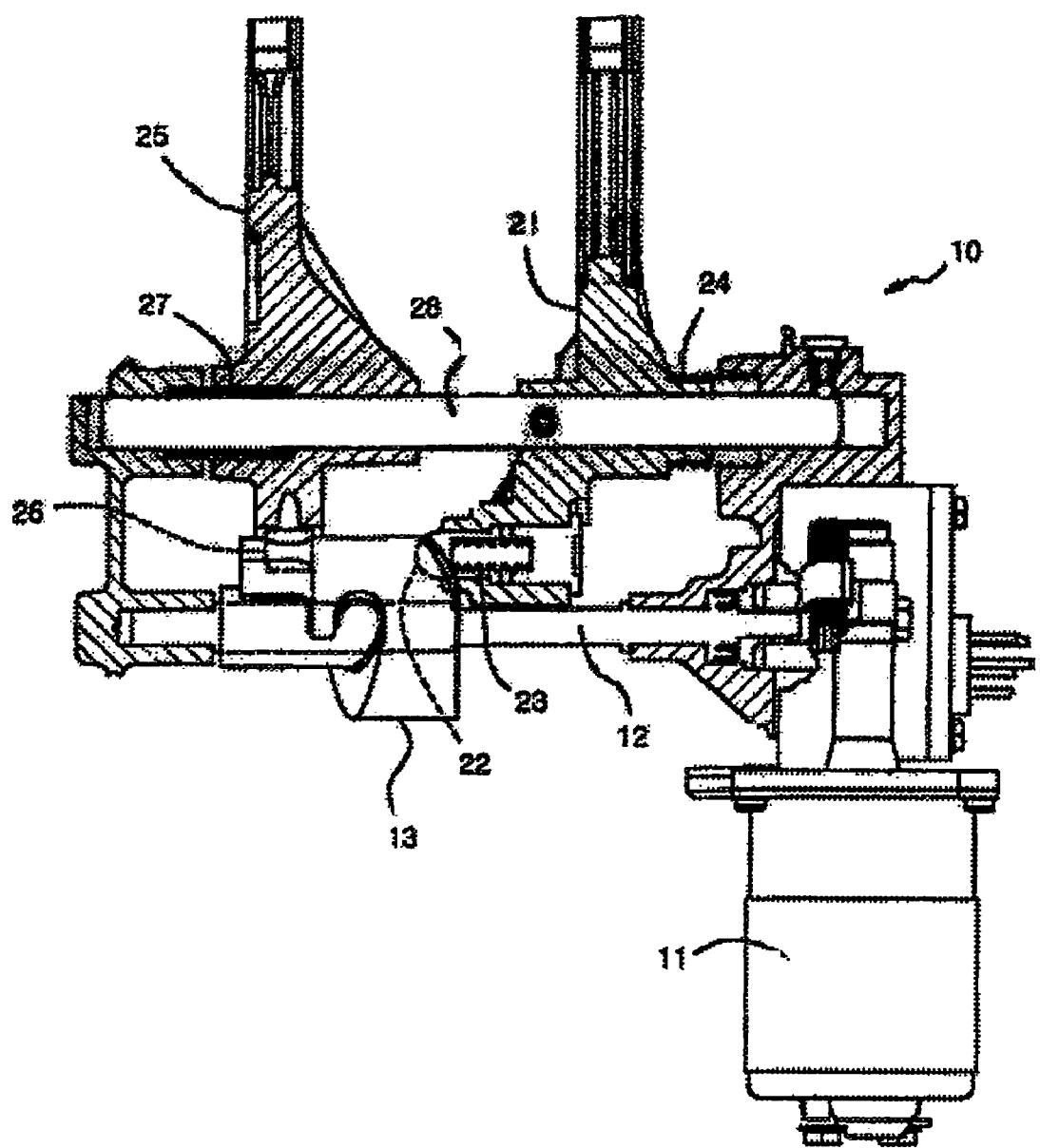
FIGS. 5 through 7 are cross-sectional views illustrating operational states of the electronically controlled transfer case assembly according to the present invention.
Figure 6:
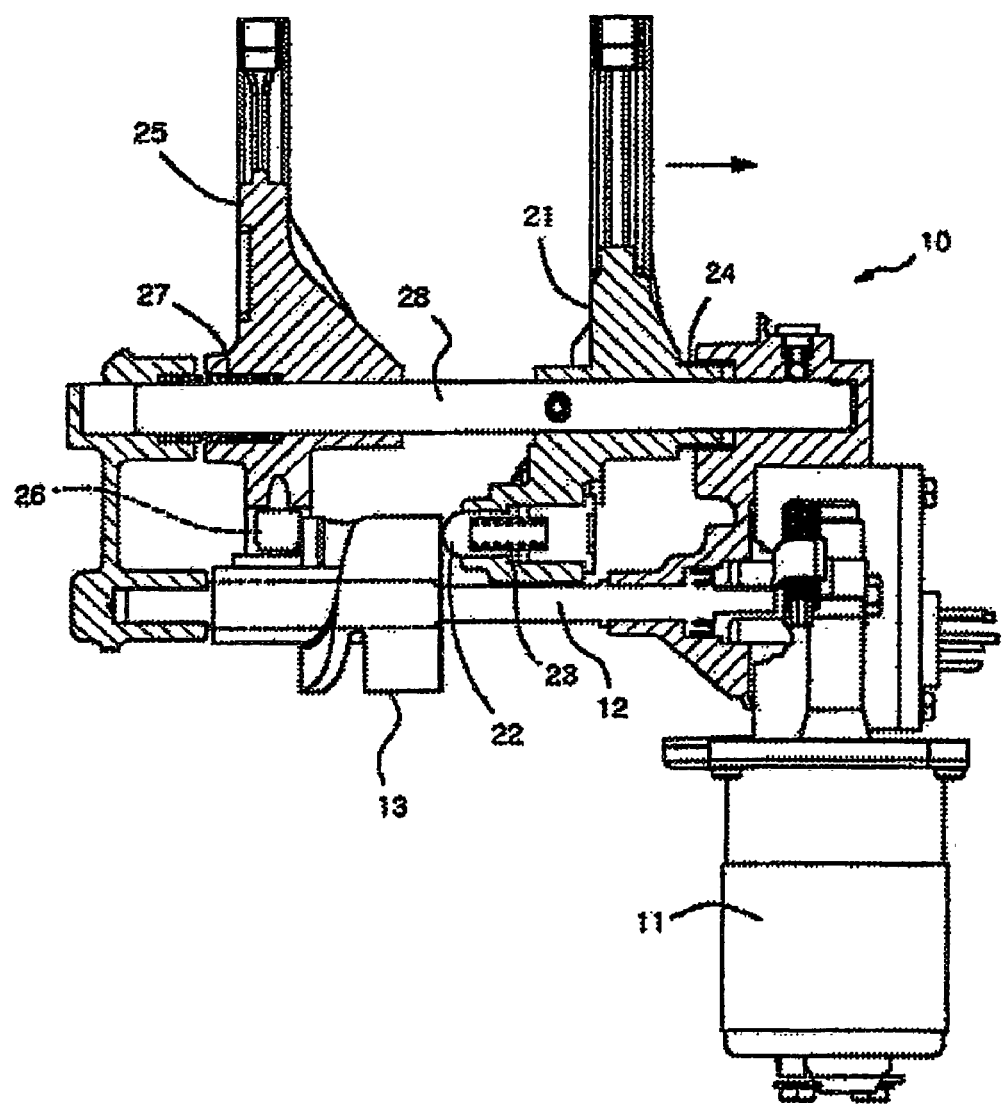
Figure 7:
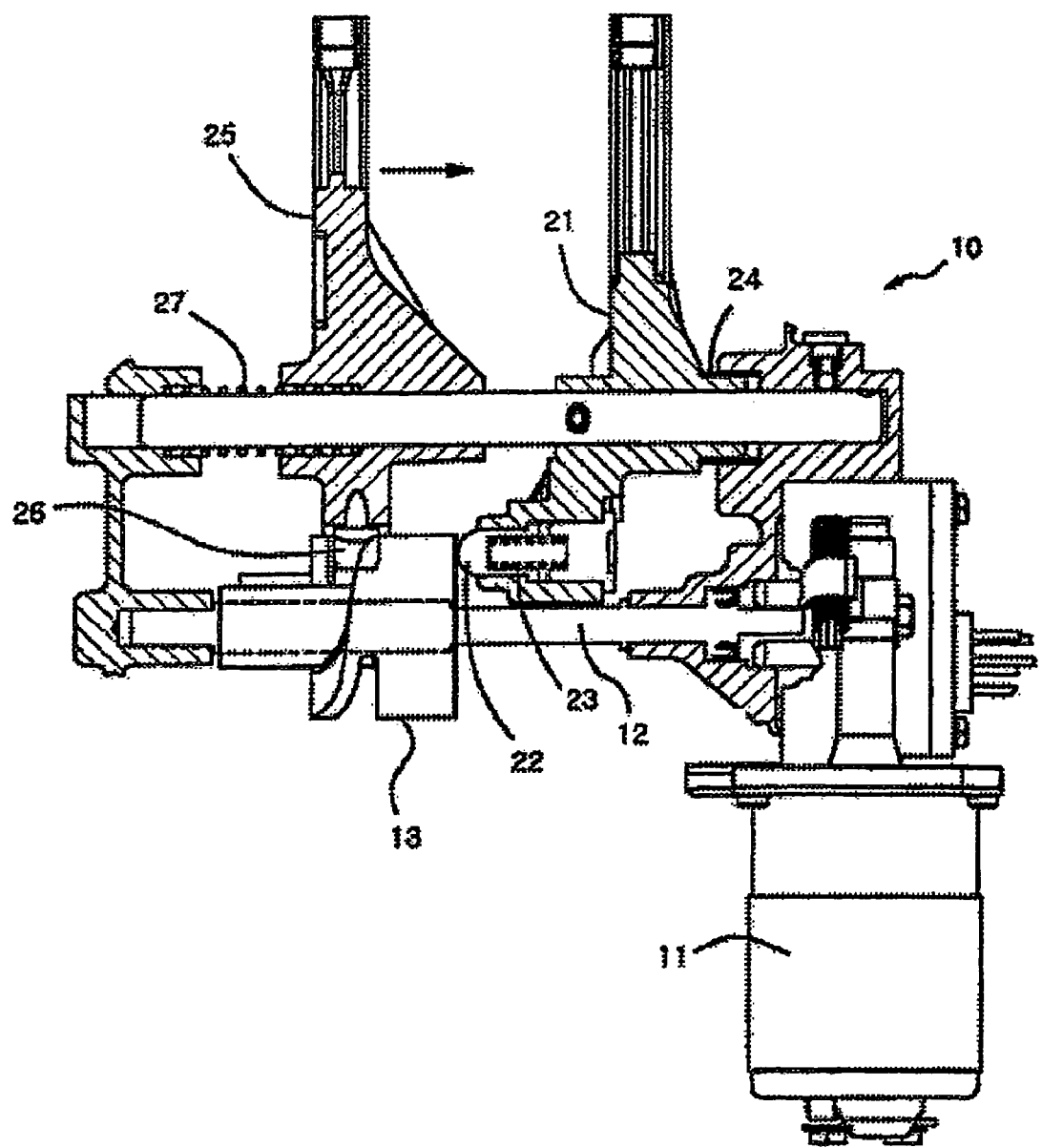

FIG. 2 is a cross-sectional view illustrating an electronically controlled transfer case assembly in accordance with a preferred embodiment of the present invention; FIGS. 3 and 4 are perspective views independently illustrating a cam of the electronically controlled transfer case assembly according to the present invention; and FIGS. 5 through 7 are cross-sectional views illustrating operational states of the electronically controlled transfer case assembly according to the present invention.

An electronic gearshift device 10 of a transfer case assembly for a four wheel drive vehicle in accordance with a preferred embodiment of the present invention comprises a motor 11, and a camshaft 12 which is rotatably driven by the motor 11.

A rail member 28 is separated from the camshaft 12 by a predetermined distance and positioned above and parallel to the camshaft 12. First and second forks 21 and 25 are installed on the rail member 28 such that they are spaced apart from each other.

First and second springs 24 and 27 for elastically supporting the first and second forks 21 and 25, respectively, are provided on the rail member 28.

Further, as characterizing features of the present invention, a cam 13 is fitted around and supported by the camshaft 12 to selectively operate the first or second forks 21 and 25 on the rail member 28 when the camshaft 12 is driven by the motor 11, to thereby effect gearshift.

Describing a detailed structure of the cam 13, as shown in FIGS. 3 and 4, the cam 13 is formed, at one end thereof with first and second operating sections 14 and 15 for operating the first fork 21 to effect conversion between a four wheel driving scheme and a two wheel driving scheme.

Also, the cam 13 is formed, at the other end thereof with third and fourth operating sections 16 and 17 for operating the second fork 25 to effect conversion between a four wheel high speed driving mode and a four wheel low speed driving mode.

At this time, describing detailed contour of the first through fourth operating sections 14, 15, 16 and 17, the first operating section 14 comprises a flattened surface, the second operating section 15 comprises a concaved surface having a predetermined radius of curvature, and each of the third and fourth operating sections 16 and 17 formed on the other end of the cam 13 comprises a plane.

Meanwhile, a plunger 22 is installed on a side of the first fork 21 adjacent to a lower end of the first fork 21. The plunger 22 is elastically supported by a compression spring 23 toward the cam 13 such that an end of the plunger 22 is elastically brought into contact with the one end of the cam 13, that is, the first and second operating sections 14 and 15 of the cam 13.

A pin roller 26 is installed on a side of the second fork 25 adjacent to a lower end of the second fork 25 such that an end of the pin roller 26 is elastically brought into elastic contact with the other end of the cam 13, that is, the third and fourth operating sections 16 and 17 of the cam 13.

Hereafter, operations of the electronic gearshift device 10 of a transfer case assembly for a four wheel drive vehicle according to the present invention, constructed as mentioned above, will be described.

First, describing an operational state under a two wheel driving scheme, as power is applied to the motor 11, the camshaft 12 connected to a rotation shaft of the motor 11 is rotatably driven.

As the camshaft 12 is rotated, the cam 13 which is fixedly fitted around the camshaft 12 is rotated integrally with the camshaft 12, and at the same time, the first and second forks 21 and 25 which are elastically brought into contact with the one and the other ends, respectively, of the cam 13 are rotated in an interlocked manner.

That is to say, in this state, the plunger 22 installed on the first fork 21 is elastically brought into contact with the first operating section 14 of the cam 13 by the elastic force of the first spring 24, and the second fork 25 compresses the second spring 27 with the pin roller 26 brought into contact with the third operating section 16.

As can be readily seen from FIG. 2, in this state, the first and second forks 21 and 25 are positioned left, by which the two wheel driving scheme is effected.

If power is applied to the motor 11 to effect conversion from the two wheel driving scheme into the four wheel driving scheme, as the camshaft 12 is rotated, the cam 13 is rotated integrally with the camshaft 12. With the rotation of the cam 13, the plunger 22 is moved from a first portion 18 to a second section 19 and thereby compresses the compression spring 23.

As the compression spring 23 is compressed in this way, the first fork 21 is moved rightward while compressing the first spring 24.

Accordingly, while not shown in the drawings, a sleeve coupled to the first fork 21 is moved to effect conversion from the two wheel driving scheme into the four wheel driving scheme.

At this time, even though the pin roller 26 is moved from the first portion 18 to the second portion 19, since the second fork 25 is held brought into contact with the third operating section 16, that is, not changed in its position, the four wheel driving scheme is maintained.

Then, when it is necessary to effect conversion from the four wheel driving scheme into the two wheel driving scheme, as the camshaft 12 and the cam 13 are reversely rotated using the motor 11, the plunger 22 and the pin roller 26 are moved from the second portion 19 to the first portion 18, as a result of which the force of the first fork 21, compressing the first spring 24, is removed and the first fork 21 is returned to a leftward position by the elastic force of the first spring 24 to effect the two wheel driving scheme.

Of course, even at this time, since the second fork 25 is held brought into contact with the third operating section 16, the two wheel driving scheme is maintained.

In the meanwhile, with the first fork 21 operated to effect the four wheel driving scheme, if it is necessary to convert a four wheel driving mode from a four wheel high speed driving mode to a four wheel low speed driving mode, the camshaft 12 and the cam 13 are further rotated in one direction using the motor 11, so that the plunger 22 and the pin roller 26 are moved to an endmost position of a third portion 20.

If the plunger 22 and the pin roller 26 are moved to the endmost position of the third portion 20, the plunger 22 is still held in the second operating section 15, and the pin roller 26 is held in the fourth operating section 17.

Therefore, while the first fork 21 is not changed in its position, the second fork 25 is moved rightward by the elastic force of the second spring 27.

Hence, as a sleeve (not shown) coupled to the second fork 25 is moved, conversion is effected from the four wheel high speed driving mode to the four wheel low speed driving mode. In the case that it is necessary to effect conversion from the four wheel low speed driving mode to the four wheel high speed driving mode, the cam 13 is reversely rotated to return the second fork 25 to its original position. In this way, the desired conversion is accomplished.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the above description, the electronic gearshift device of a transfer case assembly for a four wheel drive vehicle according to the present invention provides advantages in that gearshift means for effecting conversion between a four wheel driving scheme and a two wheel driving scheme and gearshift means for effecting conversion between a four wheel high speed driving mode and a four wheel low speed driving mode are integrated with each other by the medium of a cam for operating first and second forks. As a consequence, a driver can easily and stably implement gearshift while driving a car, safe driving is ensured, parts can be easily machined, the number of parts is decreased, and a manufacturing cost is reduced.

The invention claimed is:

1. An electronic gearshift device of a transfer case assembly for a four wheel drive vehicle, comprising:
   a motor:
   a camshaft rotatably driven by the motor;
   a rail member separated from the camshaft by a predetermined distance and positioned parallel to the camshaft;
   first and second forks installed on the rail member such that they are spaced apart from each other; and
   a cam fitted around and supported by the camshaft to selectively operate the first or second forks on the rail member to thereby effect gearshift,
   wherein the cam is formed with first and second operating sections for operating the first fork to effect conversion between a four wheel driving scheme and a two wheel driving scheme, and third and fourth operating sections for operating the second fork to effect conversion between a four wheel high speed driving mode and a four wheel low speed driving mode.

2. The electronic gearshift device as set forth in claim 1, wherein, in the cam the first operating section comprises a flattened surface, the second operating section comprises a concaved surface having a predetermined radius of curvature, and each of the third and fourth operating sections comprises a plane.

3. The electronic gearshift device as set forth in claim 1, wherein first and second springs for elastically supporting the first and second forks, respectively, are provided on the rail member.

4. The electronic gearshift deice as set forth in claim 1, wherein, adjacent to a lower end of the first fork, a plunger which is elastically supported by a compression spring is installed on a side of the first fork such that the plunger is selectively biased by the first or second operating sections as the cam is rotated.

5. The electronic gearshift device as set forth in claim 1, wherein a pin roller is installed on a side of the second fork such that the pin roller is selectively biased by the third or fourth operating sections as the cam is rotated.

* * * * *